UNITED STATES PATENT OFFICE.

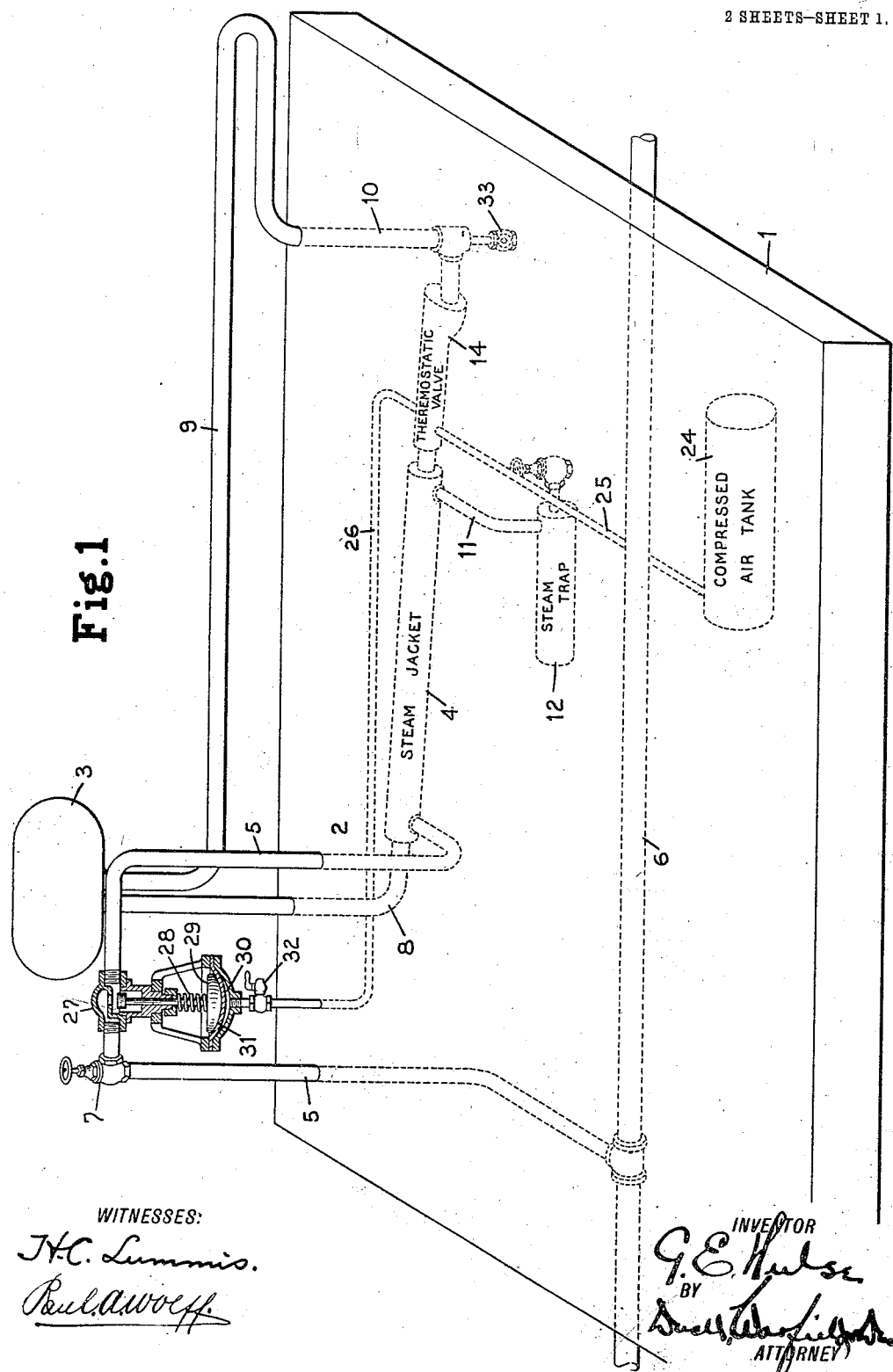

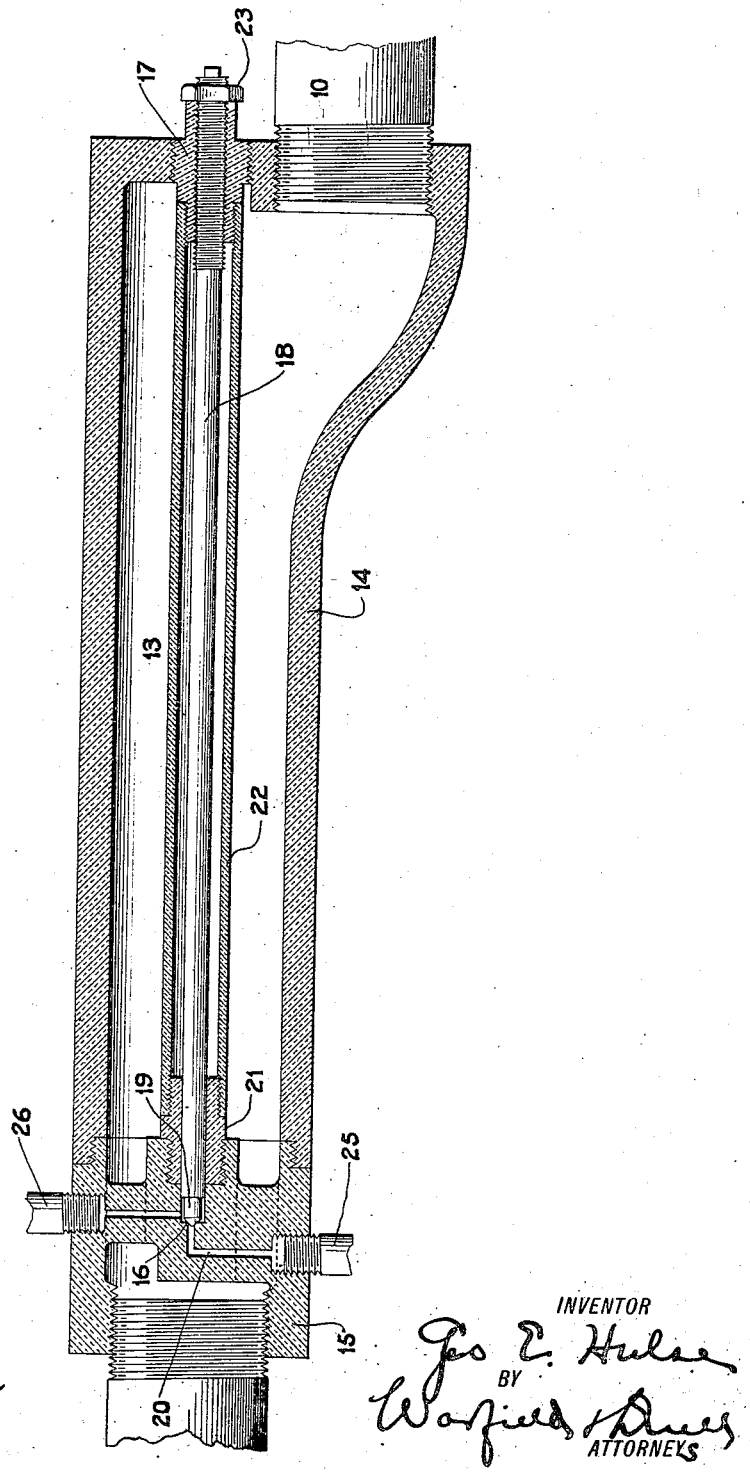

GEORGE E. HULSE, OF JERSEY CITY, NEW JERSEY, ASSIGNOR, BY MESNE ASSIGNMENTS, TO STANDARD HEAT AND VENTILATION COMPANY INC., OF NEW YORK, N. Y., A CORPORATION OF NEW YORK.

REGULATOR FOR HEATING SYSTEMS.

1,055,637.  Specification of Letters Patent.  Patented Mar. 11, 1913.

Application filed September 20, 1905. Serial No. 279,235.

*To all whom it may concern:*

Be it known that I, GEORGE E. HULSE, residing at Jersey City, in the county of Hudson and State of New Jersey, have invented certain new and useful Improvements in Regulators for Heating Systems, of which the following is a full, clear, and exact description, such as will enable others skilled in the art to which it appertains to make and use the same.

This invention relates to heating systems and has for one of its objects the provision of efficient means adapted automatically to control heat-regulating devices.

Another object is to provide a practical thermostatic controlling device particularly adapted for use in heating systems, although capable of use in a variety of other relations.

Other objects will be in part obvious and in part pointed out hereinafter.

The invention accordingly consists in the features of construction, combinations of elements and arrangement of parts which will be exemplified in the apparatus hereinafter described and the scope of the application of which will be indicated in the following claims.

In the accompanying drawings, wherein is shown one of the various possible embodiments of my invention,—Figure 1 is an isometric view showing a heating system constructed in accordance therewith, some of the parts being shown in dotted lines. Fig. 2 is a horizontal sectional view through a thermostatic controlling device.

Similar reference characters refer to similar parts throughout both views of the drawings.

Before entering into a detailed description of the specific features of my invention, and as conducive to clearer understanding of certain of the objects thereof, it may here be noted that in heating systems it is of prime importance to provide automatic controlling devices to regulate the same so that a uniform temperature may at all times and under varying conditions be maintained in the structure to be heated, and a high degree of economy be attained in the use of the heating agent. In this connection I have found that apparatus of the above type should be sensitive in action, in order to act quickly and prevent waste in heat or variation in the temperature of the structure heated. It may also be noted at this point that I have found that apparatus of the above general nature should be of the simplest construction, as it is otherwise inevitable that a more or less frequent inspection and adjustment of the parts is necessary in order to maintain the system in efficient condition; and in the case of car heating, in which relation my invention is peculiarly adapted for use, on account of the large number of individual structures the labor consumed in maintenance would be considerable. I have also found that in connection with automatic regulating means of the above general type, it is highly advantageous to place the prime regulating means at the point of greatest variation in the medium whose temperature is to be rendered substantially uniform. The above and other advantages are secured in constructions of the nature of that hereinafter described.

Referring, now, to the drawings, there is shown at 1 the flooring of a railway car, upon which this illustrative embodiment of my invention is designed to be employed. The heating apparatus comprises a system of connected piping 2 provided with the usual expansion tank 3. At the lowermost part of the piping there is positioned an encircling steam jacket 4 suitably connected by piping 5, in the present instance, with the train pipe 6, piping 5 being provided with a valve 7 adapted to be operated manually to cut off the supply of steam to steam jacket 4. A riser 8 connects that part of the piping adjacent steam jacket 4 with the radiating system 9 and return pipe 10 is designed to convey the circulating medium to the portion of said piping incased by steam jacket 4. It will, of course, be understood that suitable radiators may be connected along radiating pipe 9 as may be desired. Adjacent jacket 4 and connected therewith by pipe 11 is a trap 12, the purpose of which is to lead off the water of condensation or drainage from the jacket. It will be understood from the above description that steam conducted to the steam jacket 4 through connecting piping 5 controlled by valve 7 will heat water within the system and cause the same to circulate therethrough, the water of condensation from the steam being delivered through trap 12, as above described.

In order to insure an even temperature in the structure to be heated, and an economical use of steam, I provide means whereby the quantity of steam admitted to jacket 4 may be controlled automatically in accordance with the temperature of the circulating medium. Connected within return pipe 10 and located in proximity to steam jacket 4 is a thermostat 13, the casing 14 of which forms a portion of the piping of the heating system. The jacket or casing is formed of a metal having a relatively high coefficient of expansion, such as brass, which, in the present instance, is indicated by the alternate broken lines in Fig. 2. A fitting 15 provided with a valve seat 16 is threaded into one end of casing 14, the opposite end of said fitting being connected with that part of the piping surrounded by steam jacket 4. Fitting 15 is also composed of a highly expansible metal, in the present instance brass. Threaded into the opposite end of casing 14 is a plug 17 within which is threaded one end of rod 18 constituting a valve-stem of a metal having a relatively low coefficient of expansion, such as iron or steel. Rod or valve-stem 18 is, in the present instance, provided with a tapering end 19 which is adapted to co-act with valve-seat 16 to form a valve to open or close a passage 20 extending transversely through fitting 15, the purpose of which will be apparent hereinafter. Threadedly connected with plug 17 and with a plug 21, tapped within fitting 15, is a tube 22 which forms an inclosing casing for valve-stem 18 and is composed of a highly expansible metal, in the present instance brass. In this manner the rod 18 is, by reason of the space between itself and the tube 22, to a considerable degree protected from the effect of changes in temperature of the fluid passing through the casing 14, and inasmuch as the degree to which it partakes in the expansion and contraction of the casing and tube is thus reduced, the sensitiveness of the instrument is increased. Plug 21 is centrally apertured to receive the free end of valve-stem 18 and guide the same to its valve-seat. The outer end of valve-stem 18 is provided with a squared head in order that it may be adjusted in plug 17 and is provided with a lock-nut 23 to hold the same in adjustment.

Leading from any suitable source of fluid-pressure supply, in the present instance a storage tank 24 for the air-braking system of the car, is a tube 25 having serially connected therewith passage 20 in fitting 15, and extending from the remaining end of this passage is a tube 26 which terminates adjacent a steam-controlling valve 27. This valve is interposed in pipe 5 between train pipe 6 and steam jacket 4 and is held normally in an open condition by means of spring 28, which forces a head 29, connected with the valve-stem, downward. Tube 26 leads into the lower portion of a chamber 30 provided with a diaphragm 31. An exhaust port is provided in tube 26 adjacent the air-chamber 30, the passage through which is adjustable by means of cock 32. A valve 33 is provided for return pipe 10 in order that the water may be drawn from the heating system.

The operation of the above described embodiment of my invention, which should be largely obvious from the above description, is substantially as follows:—The heating system being filled with water from expansion tank 3, steam from train pipe 6 through connecting pipe 5 supplied to steam jacket 4 heats the water and causes the same to circulate through the heating system, as will be readily understood, controlling-valve 27 being normally open. At this point it may be noted that valve-stem 18 is adjusted in plug 17 so as normally to maintain valve 19 seated in valve-seat 16, thereby allowing controlling-valve 27 to remain open and steam to enter steam jacket 4. Should the water which circulates through the heating system return to thermostat 13 at a relatively high temperature, indicating that a less amount of heat is required in the structure to be heated, this rise in temperature will, through the unequal expansion of casing 14 and tube 22 and valve-stem 18, cause fitting 15, carrying valve-seat 16, to be drawn away from the end of valve 19 carried by valve-stem 18, thereby allowing air from storage tank 24 to travel through passage 20 and tube 26 into the air-chamber 30 of the controlling-valve 27. The pressure thereof immediately closes said valve and shuts off steam from jacket 4. This will, of course, diminish the amount of heat supplied to the heating system, and when the returning circulating water reaches the thermostat at a sufficiently low temperature, the unequal contraction of the elements of which it is constructed will cause valve-seat 16 to engage with valve 19 to cut off the fluid-pressure supply from chamber 30, and the air escaping slowly through cock 32 will allow valve 27 under the influence of spring 28 to open, and steam will again be supplied to jacket 4. Trap 12 operates to remove from steam jacket 4 the water of condensation, thereby allowing live steam to be at all times admitted to this jacket when controlling valve 27 is open. Valve-stem 18, being adjustably mounted in plug 17, is adapted to be manipulated to secure any desired adjustment with relation to valve-seat 16, so that relatively small or great differences in temperature of the returning circulating water will operate to control the fluid-pressure supply to steam-regulating valve 27, and any desired sensitiveness of action may thus be attained.

It will, accordingly, be seen that I have provided regulating means for a heating system characterized by a high degree of simplicity and efficiency in construction, coupled with marked sensitiveness and economy of operation.

While I have shown my invention as applied to a s ucture of the above type, I do not wish to be understood as limiting it to this employment, nor, in fact, to any particular method of use, as the same is capable of being used advantageously in many other forms of heating systems, although peculiarly adapted for use in the relation shown.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein described and all statements of the scope of the invention, which as a matter of language, might be said to fall therebetween.

Having described my invention, what I claim as new and desire to secure by Letters Patent is:—

1. A heating system comprising in combination, a line of connected piping, a steam jacket positioned about said piping at the lowest portion thereof, a casing located on the return side of said steam jacket which is connected with said line of piping and forms a part thereof, said casing being formed of a metal having a relatively high co-efficient of expansion, a fluid pressure actuated valve adapted to control the amount of steam supplied to said jacket, a valve within said casing for controlling the admission of the fluid under pressure to said first mentioned valve, and a stem located within said casing, a portion of which is constituted by said last mentioned valve, said stem being formed of a metal having a relatively low co-efficient of expansion, the relative expansion of said casing and said stem effecting an operation of said valve in accordance with the temperature of the circulating medium.

2. A hot water heating system comprising, in combination, a line of connected piping, a metallic casing having a relatively high co-efficient of expansion interposed in said piping at a point where the circulating water is at its lowest temperature, a steam jacket positioned about said piping on the flow side of said casing, means for supplying steam to said jacket, a fluid pressure actuated valve for regulating the amount of steam supplied to said jacket, means for supplying fluid under pressure to said valve, a valve seat provided in said casing, and a stem formed of a metal having a relatively low co-efficient of expansion fixed at one end and within said casing, the other end thereof being provided with a valve which coöperates with said seat to control the amount of the fluid under pressure supplied to said first mentioned valve, said casing and said stem constituting a thermostatic device for actuating said valve in accordance with the temperature of the circulating water at that point in said line of piping where said casing is located.

3. An apparatus of the class described, in combination, a hot water heating system adapted to permit of the circulation and recirculation of water therein, means leading a heating agent into operative relation to said hot water system to impart heat thereto, a fluid actuated controlling means for said heating agent, a valve adapted to control the admission of fluid under pressure to said controlling means, comprising a casing forming part of the hot water heating system and having a valve seat located in the path of flow of the fluid under pressure, said casing being formed of metal having a relatively high co-efficient of expansion, a stem fixed at one end within said casing, said stem being formed of metal having a relatively low co-efficient of expansion, the relative expansion of said casing and said stem operating to engage the other end of said latter member with or withdraw the same from, said seat, and a tube positioned about said stem adapted to prevent contact of the circulating water with said stem.

In testimony whereof I affix my signature, in the presence of two witnesses.

GEORGE E. HULSE.

Witnesses:
A. C. MOORE,
GEO. T. MERWIN.

---

Copies of this patent may be obtained for five cents each, by addressing the "Commissioner of Patents, Washington, D. C."